Figures 1, 2:
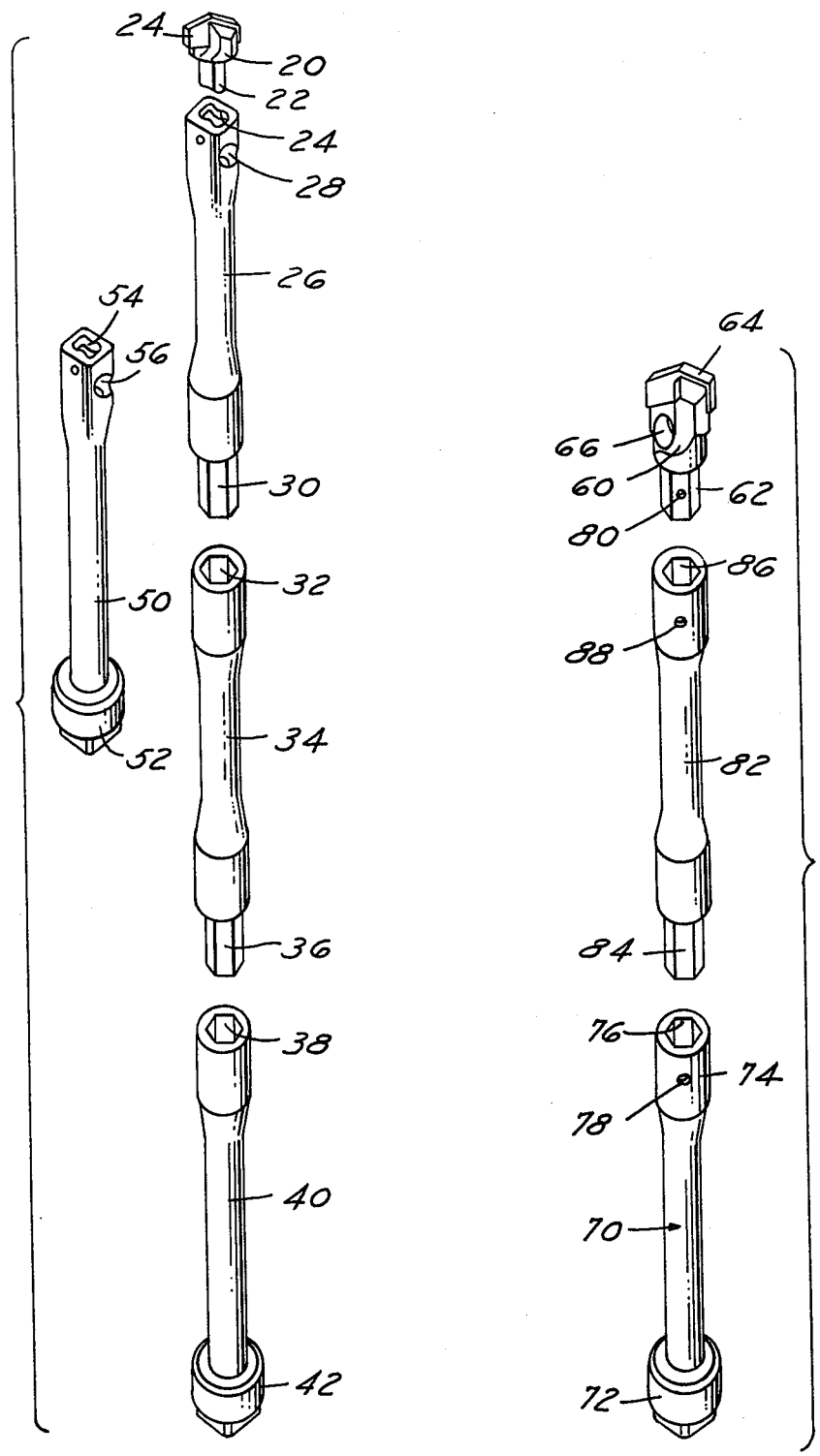

United States Patent [19]

Emmerich

[11] 4,099,585
[45] Jul. 11, 1978

[54] ROOF DRILLING SYSTEM
[75] Inventor: Kenneth C. Emmerich, Lexington, Ky.
[73] Assignee: Fansteel Inc., North Chicago, Ill.
[21] Appl. No.: 760,712
[22] Filed: Jan. 19, 1977
[51] Int. Cl.² ............................................. E21B 17/00
[52] U.S. Cl. .................................. 175/320; 285/404; 175/418; 175/410; 403/324; 403/378
[58] Field of Search ............... 175/410, 418, 415, 320; 403/324, 378, 379; 285/403, 404; 279/86; 29/522, 453

[56] References Cited
U.S. PATENT DOCUMENTS

| 1,136,987 | 4/1915 | Wakfer | 175/415 |
| 1,632,386 | 6/1927 | Waters | 403/379 |
| 2,398,532 | 4/1946 | Keehn | 29/522 |
| 2,845,203 | 7/1958 | Potash | 29/453 |
| 3,415,332 | 12/1968 | Bower, Jr. | 175/410 |
| 3,434,554 | 3/1969 | Bower, Jr. | 175/418 X |
| 4,019,590 | 4/1977 | Hansen et al. | 175/320 X |

*Primary Examiner*—Ernest R. Purser
*Assistant Examiner*—Richard E. Favreau
*Attorney, Agent, or Firm*—Barnes, Kisselle, Raisch & Choate

[57] ABSTRACT

A roof drilling system which includes a drill bit with a hollow driven shank and coolant holes in the bit flutes connected to the inside of the hollow shank, a single driver unit connectible to the drill bit and also to extension driver elements which interfit with both the bit and the driver, all of the elements being hollow and connected by retainers which secure the parts during the drilling and aid in the withdrawal from the drilled hole.

3 Claims, 9 Drawing Figures

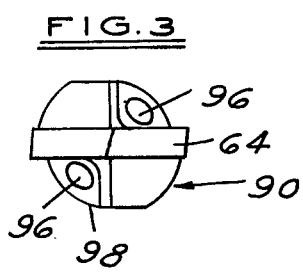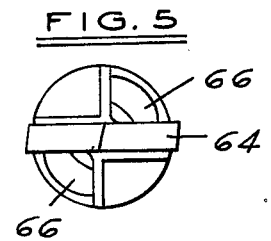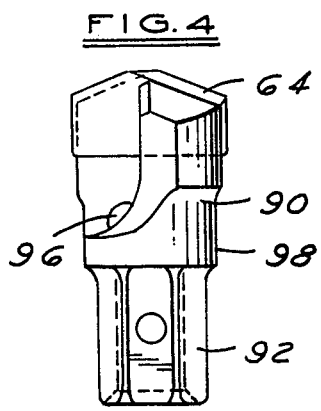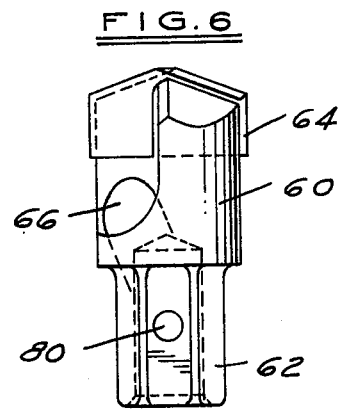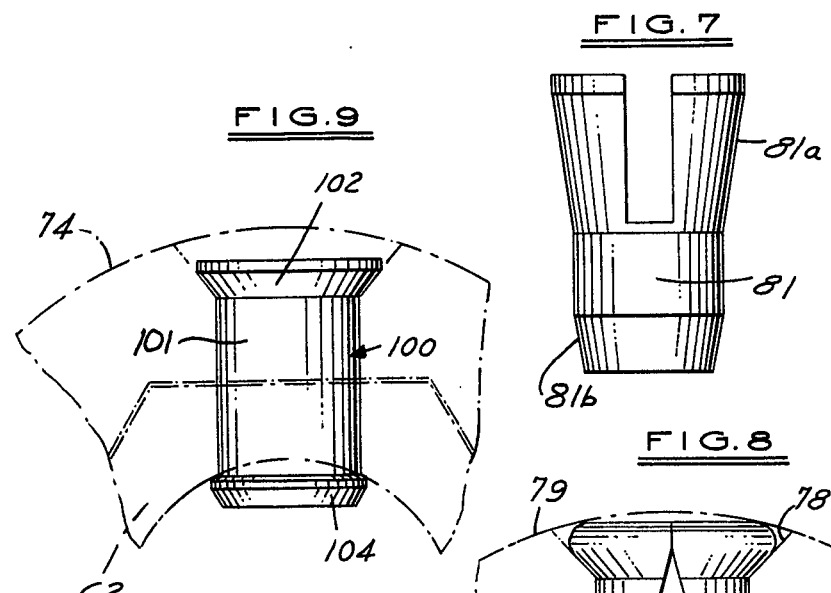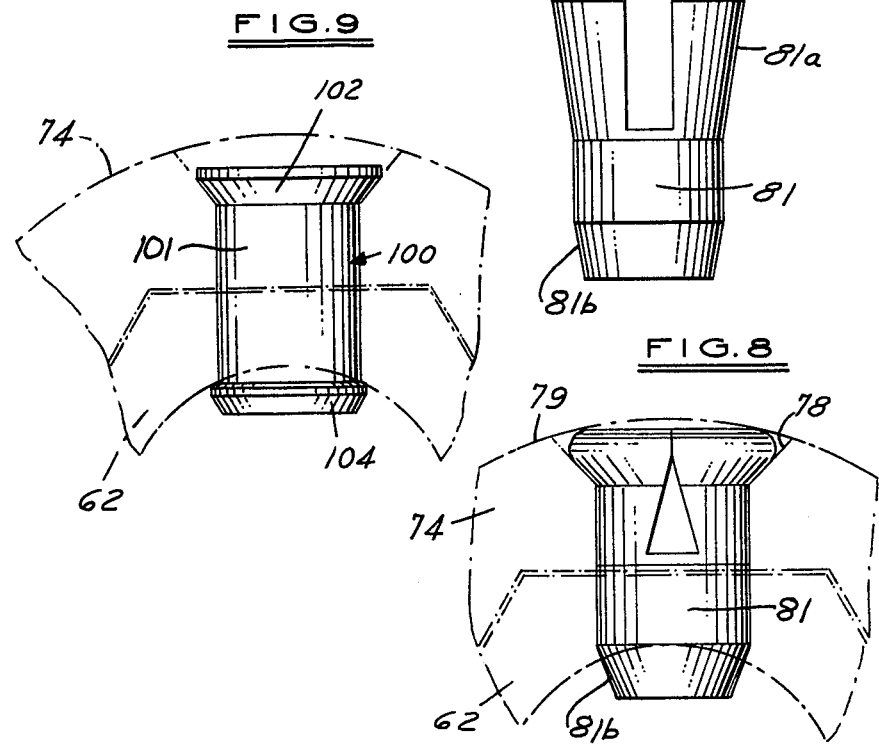

ROOF DRILLING SYSTEM

This invention relates to a Roof Drilling System and more particularly to a method and apparatus for use in the mining field in roof drilling, tunneling drilling, rock boring and so on, both as a rotary and rotary percussion system. The concept is especially adapted for use in systems which utilize water flushing with a pressure water flushing system and an air suction system.

The present invention contemplates an improved drilling system which can be used for roof drilling in mining areas where the roof areas are to be reinforced by anchor bolting systems, i.e., a system wherein a mechanical expansion and tensioning bolt is inserted in a drilled hole, or by resin bolting wherein a drilled hole is charged with a setting resin and activated by a core bolt which is inserted to mix the resin and provide a core for the resin which sets around it (Mining and Metallurgy, Bulletin No. 776, July 1971). The bit may also be used in drilling charge holes for blasting, for rock boring, highway construction, light post base anchor holes, anchorage railings and the like.

The holes used in mining applications are sometimes quite deep and a drill driver may have several sections of drive shafts linked together before the hole is complete. It has been customary in the rotation of the cutting bits to utilize a starter element, a driver, a middle extension, and a finish extension. With the present drill bit construction, the starter and the finish extension can be eliminated, and all that is needed is a driver and such middle extensions as are required for the desired depth of the hole.

The term "drilling steel" is sometimes used to describe the elements which are driving a cutting bit in rock drilling. As pointed out above, the present system eliminates various elements of the prior art systems and also provides for a stronger driving system in the sense that flushing holes can be eliminated from the driving steels. In addition, the present system reduces the inventory in the field and in the shop by eliminating the elements in the drilling system which, of course, provides a considerable savings for the customer. In addition, the system is simple and more efficient and thus saves time from the operator in the fields. No special adapters are needed for the holding of the bit for starting or other purposes.

Other objects and features of the invention relating to details of construction will be apparent in the following description and claims in which the invention is set forth, together with the detailed outline of the devices directed to persons skilled in the art to enable practical use of the invention, all in connection with the best mode presently contemplated for the practice of the invention.

Reference is made to my copending application entitled "Roof Drill Bit," Ser. No. 749,457, filed Dec. 10, 1976, directed to a drill construction for a system to be described herein.

Drawings accompany the disclosure and the various views thereof may be briefly described as:

FIG. 1, a view of the elements of the system according to the present invention.

FIG. 2, an illustration of prior art elements utilized in a drilling system.

FIGS. 3 and 4, end and side views of a drill bit to be utilized in a water flush system.

FIGS. 5 and 6, an end view and a side elevation of a bit used in a vacuum flush system.

FIG. 7, a view of a retainer device for the drill bit.

FIG. 8, a view of the retainer in position.

FIG. 9, a view of a modified retainer construction.

With reference to the drawings, the prior art is illustrated in FIG. 2 composed of a solid drill bit 20 having a drive shank portion 22 and a wear element 24. The drive shank 22 is substantially rectangular but has concavities on opposite sides of the longer width so that the shank fits into a recess 24 in a drilling steel 26.

The drilling steel has a central bore connected to openings 28 through which water or air will be driven. A hexagonal shank 30 in the bottom of the drilling steel 26 cooperates with a recess 32 in a drilling extension 34 which has a comparable shank 36 cooperating with a recess 38 in a drive steel 40 having a head 42 to connect to a rotary driver.

To the left side of FIG. 2 is a starting driver 50 having a driving head 52 and a recess 54 in the top and with fluid recesses 56 in the sides.

In the use of this system, it was customary to utilize the starting driver 50, attaching it directly to the bit 20, and providing the necessary coolant fluid either in the form of water forced upward under pressure or by suction air pulled downward to cool the bit and to remove the chips as efficiently as possible. Once the hole was started to a depth intermediate the ends of the driver steel 50, then a second element 26 would replace the driver steel 50 and this could be driven either by the driver 40 directly or with the intermediate steel 34 interposed between the driver 40 and the steel 26.

The present system contemplates just three elements instead of the five elements illustrated in connection with the prior art system. The first element consists of a drill bit as shown at the top portion of FIG. 1 comprising a body 60 having a hexagonal shank 62, a cutting and wear element 64 and provided with recesses 66 which in this particular case are used to admit air in a suction system. Details of the cutter head 60 are shown in FIG. 5.

The second essential element of this system is the driver steel 70 having a driving head 72 to attach to a rotary driver power unit which can furnish the flushing fluid either in the form of suction air or water pressure. This driver steel 70 is a hollow stem having a socket end 74 with a hexagonal recess 76 to complement the shank 62 of the bit. A hole 78 registers with a hole 80 in shank 62 to receive a retainer element 81 such as, for example, illustrated in FIG. 7. A hole may be readily started with the elements 60 and 70 because of the fact that the fluid holes for the flushing fluid are directly in the bit 60. Thus, the starting steel driver 50 can be completely eliminated from the system. An intermediate drive steel element 82 has a central bore and a shank end 84 with a socket recess 86 to cooperate with the drill shank 62 when the hole is deep enough that the driver 70 can no longer be used. A hole 88, which registers with hole 80 in shank 62, is provided for the retainer 81.

In FIGS. 3 and 4, a bit body 90 is shown having a hexagonal shank portion 92 with a wear part 64 and water recesses 96 on either side. It will be seen that portions of this bit are reduced in diameter at 98 to allow the flushing water to pass down the outside of the bit to flush away dust and drill particles.

In FIGS. 5 and 6, the bit body illustrated in FIG. 1 is shown in greater detail.

While hexagonal shanks 62 and 84 in FIG. 1 have been illustrated and are preferred, nevertheless, square, oval, or other suitable out-of-round shapes may be used with corresponding sockets to obtain the rotary drive.

It will thus be seen that a drilling system is established with a hollow bit shank and flush openings in the bit, a single driver steel for starting and general operation, and a single extension unit, all fastened for driving relation and retained by the fastening element 81 shown in FIG. 7 preferably formed of a soft deformable metal such as aluminum or brass which may be driven in and driven out of the registering holes in the telescoping parts. This retainer aids in the withdrawal of the parts from the drilled hole. The retainer has a split flared outer end 81a with a diameter larger than that of the registering holes. This end will wedge into and collapse when driven into the opening 78 in the drill steep 74. This will wedge lock both drill steel 74 and bit 62 when hammered flush with surface 79 of the drill steel as shown in FIG. 8. The material of the retainer is soft aluminum or brass so it may be driven by a drift pin through the registering holes for removal. The plug has a lead end 81b tapered inwardly to pilot the plug into and out of the retaining holes.

Other retainers such as molded plastic pins (Teflon or nylon), resilient pins, clamp retainers, set screws, roll pins, and the like, may be used. It is preferable that the retainers be such that they may be inserted radially into the registering holes and then removed by driving them diametrically through and out with a drift pin.

In FIG. 9, a modified plastic retainer plug 100 is shown having a body 101, a flanged outer end 102, larger than the registering holes, to limit the initial inward movement of the plug and a smaller flanged annulet 104, larger than the registering holes, to snap into the bore of the bit body shank on the driver socket. The material of the retainer is tough plastic or rubber, but it is also resilient enough that it may be driven through the registering holes for removal. The annulet flanges 102 and 104 each has a tapered portion ensmalling from the outer diameter. This provides a lead pilot end at 104.

What I claim is:

1. A mining drill system which comprises:
    (a) a bit body having a cutting end and a driving shank at the opposite end to interfit in driving engagement with a driving steel tube, said shank having a central bore terminating in openings in the body leading to the cutting end,
    (b) a steel tube driver having an attachment at one end for a mechanical driving mechanism and having a socket at the other end to receive the shank of a bit in driving engagement, said bore of said bit body driving shank being in communication with the interior of said tube,
    (c) said bit body shank and said socket having radially registering holes to receive a retainer to hold said body and driver together against tensioning forces,
    (d) a plug-like retainer of deformable material in said holes to secure said shank and socket together, and
    (e) said plug of deformable material having a flared split end with a diameter larger than said holes prior to being forced into said registering holes.

2. A mining drill system which comprises:
    (a) a bit body having a cutting end and a driving shank at the opposite end to interfit in driving engagement with a driving steel tube, said shank having a central bore terminating in openings in the body leading to the cutting end,
    (b) a steel tube driver having an attachment at one end for a mechanical driving mechanism and having a socket at the other end to receive the shank of a bit in driving engagement, said bore of said bit body driving shank being in communication with the interior of said tube,
    (c) said bit body shank and said socket having radially registering holes to receive a retainer to hold said body and driver together against tensioning forces,
    (d) a plug-like retainer of deformable material in said holes to secure said shank and socket together, and
    (e) said plug of deformable material having a lead end and a trailing end portion with a diameter larger than said holes, said lead end being compressible to pass through said registering holes and expand beyond said holes whereby said ends retain said plug in said holes.

3. In a mining drill system which includes a hollow steel driver tube having one end for a mechanical driving mechanism and having a female socket at the other end of acircular cross-section, a drill bit having a shank with a male end to be received in and driven by said female socket, and hollow drill tube extensions are utilized having a female socket to receive said male end of said drill bit shank, and a male end to be received in the acircular socket of said driver tube and in a similar socket in a drill tube extension, that improvement in which said driver tube and said extension tubes have substantially imperforate walls and in which the shank end of said drill bit has a central bore and said drill bit has cutting prongs in two quadrants on opposite sides of perpendicular diameters with flutes originating at the base of said prongs in the other two quadrants, and coolant passages formed in said drill body at the base of said flutes connected to said central bore to effect coolant flow past the ends of the cutting prongs in connection with coolant flow through said driver tube and said tube extensions.

* * * * *